United States Patent
Pierce et al.

(10) Patent No.: US 9,435,489 B2
(45) Date of Patent: Sep. 6, 2016

(54) HYDROGEN RELEASE SYSTEM

(75) Inventors: Jordan Christopher Pierce, Queensland (AU); Matthew Campbell Greaves, Queensland (AU); Stephanie Maya Moroz, Queensland (AU); Andrew Charles Duguid, Queensland (AU); Alexander Warner Knight, Queensland (AU)

(73) Assignee: Hydrexia Pty Ltd, Queensland (AU)

( * ) Notice: Subject to any disclaimer, the term of this patent is extended or adjusted under 35 U.S.C. 154(b) by 688 days.

(21) Appl. No.: 13/577,358

(22) PCT Filed: Feb. 23, 2011

(86) PCT No.: PCT/AU2011/000197
§ 371 (c)(1),
(2), (4) Date: Aug. 6, 2012

(87) PCT Pub. No.: WO2011/103627
PCT Pub. Date: Sep. 1, 2011

(65) Prior Publication Data
US 2012/0298206 A1 Nov. 29, 2012

(30) Foreign Application Priority Data

Feb. 24, 2010 (AU) .................................. 2010900775

(51) Int. Cl.
*F17C 11/00* (2006.01)

(52) U.S. Cl.
CPC ............ *F17C 11/005* (2013.01); *Y02E 60/321* (2013.01); *Y10T 137/0318* (2015.04); *Y10T 137/6416* (2015.04)

(58) Field of Classification Search
CPC ........... F17C 11/005; Y10T 137/6416; Y10T 137/0318; Y02E 60/321
USPC ......................................... 137/113, 256, 334
See application file for complete search history.

(56) References Cited

U.S. PATENT DOCUMENTS

| | | |
|---|---|---|
| 4,016,836 A | 4/1977 | Kay et al. |
| 4,200,624 A | 4/1980 | Muller et al. |

(Continued)

FOREIGN PATENT DOCUMENTS

| | | |
|---|---|---|
| CA | 1177624 | 11/1984 |
| CA | 2219522 C | 11/1996 |

(Continued)

OTHER PUBLICATIONS

Gschneidner et al., Properties of Pure Metals-Mischmetal (MM), ASM Handbook, 1990, ASM International, vol. 2, p. 1.

(Continued)

*Primary Examiner* — Kevin Murphy
*Assistant Examiner* — Nicole Wentlandt
(74) *Attorney, Agent, or Firm* — The Dobrusin Law Firm, P.C.; Daniel P. Aleksynas

(57) ABSTRACT

A system for discharging hydrogen from two or more hydrogen storage vessels (1A, 1B, 1C) containing solid hydrogen storage material. The system includes at least one hydrogen supply line for connecting the hydrogen storage vessels to a hydrogen demand (3), an energy delivery system (6A, 6B, 6C) to provide heat to the hydrogen storage material in each hydrogen storage vessel to desorb hydrogen from the solid hydrogen storage material, and one or more supply connection conduits (4A, 4B, 4C) for connecting the supply line or lines to the hydrogen storage vessels (1A, 1B, 1C). Each supply connection conduit has a backflow prevention device (5A, 5B, 5C) to prevent hydrogen in the supply line from flowing back into the hydrogen storage vessels (1A, 1B, 1C). Also disclosed is a system for delivering a supply of hydrogen to a hydrogen supply line including a control system (7) to determine the timing of activation of an energy delivery system based (6A, 6B, 6C) on the hydrogen demand in the hydrogen supply line. The control system (7) activates the energy delivery system (6A, 6B, 6C) in the next hydrogen storage unit to provide a sufficient period of time for the material in the next hydrogen storage vessel to heat to the temperature at which hydrogen is provided at the supply pressure for the hydrogen supply line.

16 Claims, 5 Drawing Sheets

(56) References Cited

U.S. PATENT DOCUMENTS

| | | |
|---|---|---|
| 4,402,187 A | 9/1983 | Golben et al. |
| 4,446,111 A | 5/1984 | Halene et al. |
| 4,446,121 A | 5/1984 | Gamo |
| 4,946,646 A | 8/1990 | Gamo et al. |
| 4,964,524 A | 10/1990 | Halene |
| 5,006,328 A | 4/1991 | Hong |
| 5,366,820 A * | 11/1994 | Tsutsumi et al. ............ 429/421 |
| 5,501,917 A | 3/1996 | Hong |
| 5,506,069 A | 4/1996 | Ovshinsky et al. |
| 5,695,530 A | 12/1997 | Hong et al. |
| 5,733,680 A | 3/1998 | Hong |
| 5,766,799 A | 6/1998 | Hong |
| 5,906,792 A | 5/1999 | Schulz |
| 6,099,811 A | 8/2000 | Stetson et al. |
| 6,153,032 A | 11/2000 | Iba |
| 6,207,104 B1 | 3/2001 | Kadir et al. |
| 6,258,184 B1 | 7/2001 | Iba et al. |
| 6,274,194 B1 | 8/2001 | Mori et al. |
| 6,328,821 B1 | 12/2001 | Ovshinsky et al. |
| 6,338,764 B1 | 1/2002 | Mori et al. |
| 6,387,152 B1 | 5/2002 | Klassen et al. |
| 6,418,275 B1 | 7/2002 | Yang |
| 6,471,935 B2 | 10/2002 | Jensen et al. |
| 6,478,844 B1 | 11/2002 | Ovshinsky |
| 6,491,866 B1 | 12/2002 | Ovshinsky et al. |
| 6,508,866 B1 | 1/2003 | Golben |
| 6,602,639 B1 | 8/2003 | Nakamura |
| 6,630,648 B2 * | 10/2003 | Gruenwald ................ 219/385 |
| 6,689,193 B1 | 2/2004 | Hosoe et al. |
| 6,702,878 B2 | 3/2004 | Ito et al. |
| 6,709,497 B2 | 3/2004 | Myasnikov et al. |
| 6,726,783 B1 | 4/2004 | Young et al. |
| 6,746,645 B2 | 6/2004 | Ovshinsky et al. |
| 7,056,397 B2 | 6/2006 | Noreus et al. |
| 7,060,120 B1 | 6/2006 | Kanoya et al. |
| 7,094,387 B2 | 8/2006 | Zidan |
| 7,115,247 B2 | 10/2006 | Zhao et al. |
| 7,128,997 B2 | 10/2006 | Harding et al. |
| 7,147,690 B2 * | 12/2006 | Shimada et al. ............. 95/106 |
| 7,175,721 B2 | 2/2007 | Takata et al. |
| 7,175,826 B2 | 2/2007 | Lemmon et al. |
| 2002/0100369 A1 | 8/2002 | Kuriiwa et al. |
| 2002/0197181 A1 | 12/2002 | Osawa et al. |
| 2004/0031591 A1 | 2/2004 | Myasnikov et al. |
| 2004/0110023 A1 | 6/2004 | Towata et al. |
| 2006/0027041 A1 | 2/2006 | Arashima et al. |
| 2006/0027272 A1 | 2/2006 | Tomlinson et al. |
| 2006/0032561 A1 | 2/2006 | Young et al. |
| 2006/0051233 A1 | 3/2006 | Ugai et al. |
| 2006/0051656 A1 | 3/2006 | Ouwerkerk et al. |
| 2006/0068286 A1 | 3/2006 | Mukai et al. |
| 2006/0073066 A1 | 4/2006 | Osawa et al. |
| 2006/0099127 A1 | 5/2006 | Zaluska et al. |
| 2006/0108457 A1 | 5/2006 | Pratt et al. |
| 2006/0159613 A1 | 7/2006 | McGrady |
| 2006/0166099 A1 | 7/2006 | Okabe et al. |
| 2006/0199076 A1 | 9/2006 | Yasuoka et al. |
| 2006/0246177 A1 * | 11/2006 | Miki et al. .................. 426/24 |
| 2006/0257314 A1 | 11/2006 | Natarajan |
| 2006/0266441 A1 | 11/2006 | Fetcenko et al. |
| 2007/0006950 A1 | 1/2007 | Okada et al. |
| 2009/0123325 A1 | 5/2009 | Dahle |

FOREIGN PATENT DOCUMENTS

| | | |
|---|---|---|
| CN | 1256456 C | 1/2006 |
| CN | 1754972 | 4/2006 |
| CN | 1769506 A | 5/2006 |
| CN | 1786239 A | 6/2006 |
| GB | 2148477 A | 5/1985 |
| JP | 19880277875 | 5/1990 |
| JP | 2002/180174 A | 6/2002 |
| JP | 2001-213604 | 1/2003 |
| JP | 2003/147471 A | 5/2003 |
| JP | 2003/147472 A | 5/2003 |
| JP | 2006-177434 | 7/2006 |
| JP | 2006-179441 | 7/2006 |
| WO | 95/34918 | 12/1995 |
| WO | 96/19594 | 6/1996 |
| WO | 96/36083 | 11/1996 |
| WO | 97/19202 | 5/1997 |
| WO | 99/55926 | 11/1999 |
| WO | 01/38591 | 5/2001 |
| WO | 01/39289 | 5/2001 |
| WO | 01/92592 | 12/2001 |
| WO | 02/07240 | 1/2002 |
| WO | 02/43170 | 5/2002 |
| WO | 03/002451 | 1/2003 |
| WO | 03/006874 | 1/2003 |
| WO | 2005/060547 | 7/2005 |
| WO | 2005/100624 | 10/2005 |
| WO | 2006/029027 A1 | 3/2006 |
| WO | 2006/033847 | 3/2006 |
| WO | 2006/036554 | 4/2006 |
| WO | 2006/060851 | 6/2006 |
| WO | 2006/063627 | 6/2006 |
| WO | 2006/075501 | 7/2006 |
| WO | 2006/079312 | 8/2006 |
| WO | 2006/085542 | 8/2006 |
| WO | 2006/095339 | 9/2006 |
| WO | 2006/114728 | 11/2006 |
| WO | 2007/003679 | 1/2007 |
| WO | 2007/004712 | 1/2007 |
| WO | 2007/018291 | 2/2007 |
| WO | 2007/018292 | 2/2007 |
| WO | 2007/019749 | 2/2007 |
| WO | 2007/021055 | 2/2007 |
| WO | 2008/109011 A2 | 9/2008 |
| WO | 2009/000357 A2 | 12/2008 |
| WO | 2009/109962 A2 | 9/2009 |
| WO | 2011/103627 A1 | 1/2011 |
| WO | 2011/103626 A2 | 9/2011 |

OTHER PUBLICATIONS

Written Opinion of International Search Authority, dated Apr. 21, 2011, Application No. PCT/AU2011/000197.
International Search Report, Application No. PCT/AU2011/000197, dated Apr. 5, 2011.
Kim and Hong, Materials Transactions, 43, 1741-1747, 2002.
Orimo and Fuji, Applied Physics A, 72, 167-186, 2001.
Co-Pending U.S. Appl. No. 11/720,493, filed May 30, 2007 Published as 09-0123325 on May 14, 2009.
Co-Pending U.S. Appl. No. 13/577,793, filed Aug. 8, 2012, Published WO2011/103627 on Sep. 1, 2011.
Japanese Office Action dated Dec. 26, 2014, Application No. 2012-554164.

* cited by examiner

HYDROGEN RELEASE SYSTEM

CLAIM OF PRIORITY

This application claims priority from PCT Application Serial No. PCT/AU2011/000197, filed 23 Feb. 2011 (published as WO2011/103627) and Australian application serial number 2010900775 filed 24 Feb. 2010, the contents of which are hereby incorporated herein by reference in their entirety.

FIELD OF THE INVENTION

This invention relates to a hydrogen release system and in particular a hydrogen release system including two or more hydrogen storage vessels in which hydrogen is stored in the vessels within a hydrogen storage material.

BACKGROUND OF THE INVENTION

Hydrogen storage units utilising metal hydrides such as catalysed $MgH_2$ require temperatures above 280° C. to effect a positive pressure desorption. The heat loss from a heated well insulated solid state storage cylinder with the dimensions of a commonly used G sized compressed gas cylinder can approximate 500 watts. Therefore, the heat loss from a heated 16 cylinder manifolded solid state pack can approximate 8 kilowatts. This 8 kilowatts is additional to the energy required to break the MH-hydrogen bonds and affect the adsorption. Hence the resulting thermal efficiency of such a system is extremely low resulting in increased electricity usage and poor carbon footprint.

As each storage vessel requires significant heat input to desorb hydrogen, it is advantageous to heat one vessel at a time (1) to reduce the total heating power requirement at start-up or (2) enable the desorption of hydrogen to occur at a much faster rate when a fixed amount of heating power is available. Hence, the applicant is pursuing the concept of a manifolded storage system including a multiple number of hydrogen storage vessels where only one cylinder is desorbing at a time.

Unlike a compressed gas storage unit, a solid state hydrogen storage unit containing hydrogen storage material empties under a constant pressure. In a compressed gas unit, the depth of discharge can be accurately inferred from the remaining gas pressure in the cylinder. In contrast, a solid state hydrogen storage unit will discharge from full to over 90% empty at a constant equilibrium pressure determined by the operating temperature. Once the volume of stored gas is too low to supply the flow for the required demand, the pressure in the hydrogen storage vessel will reduce quickly from the equilibrium point to zero. This is typically once the depth of discharge is beyond 90%.

Generally, when hydrogen is being desorbed from only a single vessel at a time, once the equilibrium pressure in that hydrogen storage vessel begins to drop, it is too late to start heating up the next cylinder in sequence as the time to bring the vessel to desorption pressure and temperature far exceeds the remaining supply capacity of the current near empty vessel. In order to provide a constant supply of hydrogen to meet a hydrogen demand, it is desirable that the next hydrogen storage vessel in sequence begins heating well before the constant equilibrium pressure begins to drop.

Additionally, once the active desorbing cylinder is empty, it is desirable to cool down the cylinder to minimise heat loss. However, since the hydriding/dehydriding reaction is a reversible reaction, the reaction will reverse and the hydrogen storage material will absorb hydrogen once the temperature of the hydrogen storage material drops. FIG. 1 shows the absorption rate of $MgH_2$ as a function of temperature for a given pressure. For example, the plot of the absorption rate indicates that the reaction is in the desorption direction at temperatures above the equilibrium temperature. For temperatures below the equilibrium point the reaction is in the absorption direction. Therefore, if the cylinders are connected in parallel to a supply manifold and the next cylinder in the sequence is now supplying hydrogen by being heated to above the equilibrium temperature, the previous cylinder will absorb all of this hydrogen as it cools down below the equilibrium point leaving zero net hydrogen supply to meet the hydrogen demand.

It is desirable that the present invention provides a hydrogen storage system or supply arrangement which addresses one or more of the above problems.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

According to one aspect of the invention there is provided a system for discharging hydrogen from one or more hydrogen storage vessels, the hydrogen storage vessel or vessels containing solid hydrogen storage material, the system including:

a hydrogen supply line for connecting to a hydrogen demand;

an energy delivery system to provide heat to the hydrogen storage material in at least one of the hydrogen storage vessel to desorb hydrogen from the solid hydrogen storage material;

one or more supply connection conduits for connecting the supply line to one or more hydrogen storage vessels; wherein each supply connection conduit connected to a hydrogen storage vessel has a backflow prevention device to prevent or limit hydrogen in the supply line from flowing back into that hydrogen storage vessel when the solid storage material is no longer desorbing hydrogen at the pressure of the supply line.

In the accordance with all aspects of the invention, preferably, when the solid storage material is no longer desorbing hydrogen at the pressure of the supply line, the energy delivery system is deactivated and no longer provides heat to the hydrogen storage vessel.

In preferred forms of the invention the backflow prevention device is a one-way valve or may simply be a shut-off valve. The provision of the backflow prevention device prevents hydrogen in the hydrogen supply line from re-entering an emptied hydrogen storage vessel in which a substantial proportion of the hydrogen has been desorbed from the hydrogen storage unit and the energy delivery system deactivated or allows the hydrogen to leak back into the exhausted hydrogen storage vessel at an intended low leakage rate. Thus, as the temperature of the hydrogen storage material drops and the hydrogen storage reaction proceeds in the direction of absorbing hydrogen, hydrogen in the hydrogen supply line is prevented from re-entering or only a limited amount allowed to re-enter the emptied hydrogen storage unit from the hydrogen supply line.

As the kinetics driving the absorption of hydrogen into the cooled hydrogen storage material will absorb all of the available hydrogen in the emptied hydrogen storage unit and create a partial vacuum in the hydrogen storage vessel. In some instances, it may be desirable for the vacuum to develop.

The invention may provide a means to fill the vacuum by either supplying gases other than hydrogen such as argon, air or nitrogen or provide hydrogen to be provided to the cooling material from an auxiliary hydrogen supply. The gases other than hydrogen may be supplied or air may be intentionally allowed to leak into the vessels as they cool.

The auxiliary hydrogen supply may be connectible to the respective emptied hydrogen storage vessel when the energy delivery system to the hydrogen storage vessel is deactivated or may alternatively be a small amount of the supplied hydrogen taken off a branch outlet to the supply and returned to the vessels.

When an auxiliary hydrogen supply is provided, an amount of hydrogen is fed into the emptied hydrogen storage unit to prevent a vacuum being created. At pressures below the operating pressure for desorbing hydrogen, the kinetics for absorbing hydrogen reduces dramatically. It is preferred that the auxiliary hydrogen supply, supply hydrogen to the emptied hydrogen storage unit to maintain the pressure in the hydrogen storage vessel at atmospheric or slightly above atmospheric pressure in order to prevent leaks forming in the hydrogen storage unit and air entering the unit.

As mentioned above, the auxiliary hydrogen supply may be an auxiliary hydrogen conduit from the supply line to at least the hydrogen storage vessel which has been deactivated. The hydrogen storage conduit preferably has a pressure control valve to supply hydrogen to the deactivated hydrogen storage vessel at a pressure lower than the pressure in the supply line and preferably at atmospheric to 2 bara (or slightly above atmospheric pressure). In one embodiment, the pressure control valve is a step down valve. Alternatively, the auxiliary hydrogen supply may be a secondary hydrogen storage cylinder such as a hydrogen gas cylinder supplying gas at a pressure of between atmospheric and two atmospheres to maintain the pressure in the deactivated hydrogen storage unit at a pressure positive to atmospheric pressure.

To further limit the amount of hydrogen reabsorbed into the cooling emptied hydrogen storage cylinder, the rate of cooling of the hydrogen storage material may be increased by improving the cooling of the emptied cylinder by either or both passive or active cooling of the cylinder. Passive cooling may take the form of removing any external insulation which may be covering the exterior of the cylinder and active cooling may involve the use of an air blower over the exterior surface of the emptied cylinder or the use of a water-cooled jacket.

In another aspect of the invention there is provided a system for delivering a supply of hydrogen to a hydrogen supply line including:
one or more hydrogen storage vessels containing solid hydrogen storage material,
at least one energy delivery system to supply heat to the solid hydrogen storage material in at least one hydrogen storage vessel, the heat being sufficient to desorb hydrogen from the solid hydrogen storage material; and
a control system to control the timing of activation of the energy delivery system based on the hydrogen demand in the hydrogen supply line, the control system being configured to anticipate a time when hydrogen will need to be supplied from the hydrogen storage vessel to the hydrogen supply line to meet the hydrogen demand, and activate the energy delivery system in the hydrogen storage vessel a period of time prior to the anticipated time to allow the material in the hydrogen storage vessel to heat to the temperature at which hydrogen can be supplied at the supply pressure of the hydrogen supply line to meet the hydrogen demand in the supply line.

The above invention may be applicable to a single hydrogen storage vessel in having an energy delivery system and control, system. The control system would monitor the demand and activate the energy delivery system in response to variable which indicates that hydrogen from the hydrogen storage vessel will be required to meet the anticipated hydrogen demand.

However, in a preferred form, the above system includes two or more hydrogen storage vessels containing hydrogen storage material, the control system being configured to anticipate or determine a time when hydrogen supply from a first hydrogen storage vessels will fall below a predetermined level and activate the energy delivery system in a second hydrogen storage vessel a predetermined time prior to the anticipated or determined time to allow the material in the second hydrogen storage vessel to heat to the temperature at which hydrogen can be supplied at the supply pressure of the hydrogen supply line to meet the hydrogen demand in the supply line.

In the preferred form of this invention, the control system comprises a sensor which monitors a variable of hydrogen supply to the supply line and a processor which activates the energy delivery system in the next sequential hydrogen supply vessel when it determines from signals from the sensor that the hydrogen supply in the hydrogen storage vessel currently connected to the hydrogen supply line has fallen below a predetermined level.

In another aspect of the invention there is provided a method of supplying hydrogen from a hydrogen delivery system to a hydrogen supply line, the system including one or more hydrogen storage vessels containing solid hydrogen storage material, at least one energy delivery system to supply heat to the solid hydrogen storage material in at least one hydrogen storage vessel, the heat being sufficient to desorb hydrogen from the solid hydrogen storage material; and a control system to control the timing of activation of the energy delivery system based on the hydrogen demand in the hydrogen supply line.

The method includes the steps of anticipating or determining a time when hydrogen will need to be supplied from the hydrogen storage vessel to the hydrogen supply line to meet the hydrogen demand, and activating the energy delivery system in the hydrogen storage vessel a period of time prior to the anticipated time to allow the material in the hydrogen storage vessel to heat to the temperature at which hydrogen can be supplied at the supply pressure of the hydrogen supply line to meet the hydrogen demand in the supply line.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS/FIGURES

DETAILED DESCRIPTION OF THE EMBODIMENTS

Figure 4:
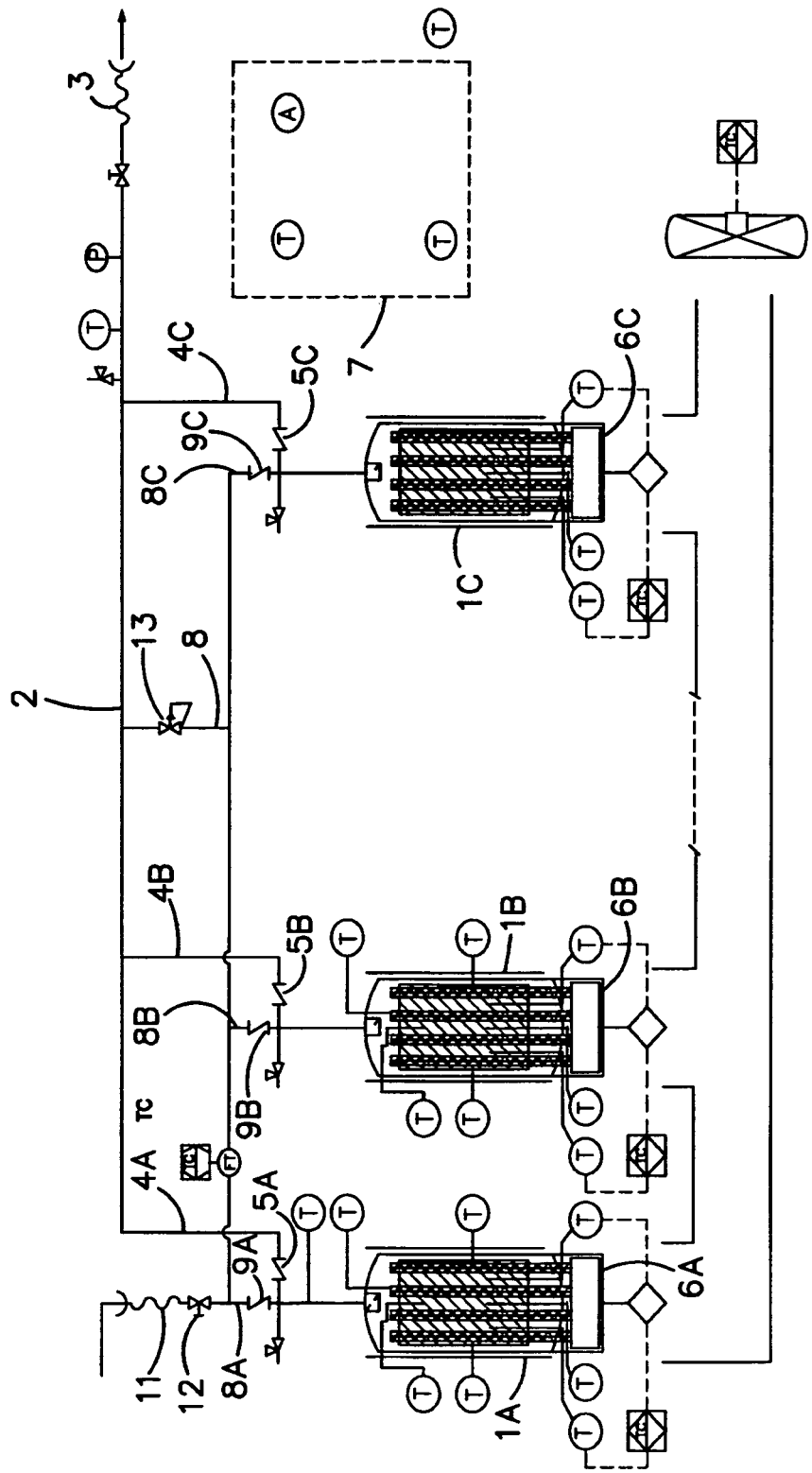
FIG. 4 is a process and instrumentation diagram showing configuration of passive gas valves.
Figure 5:
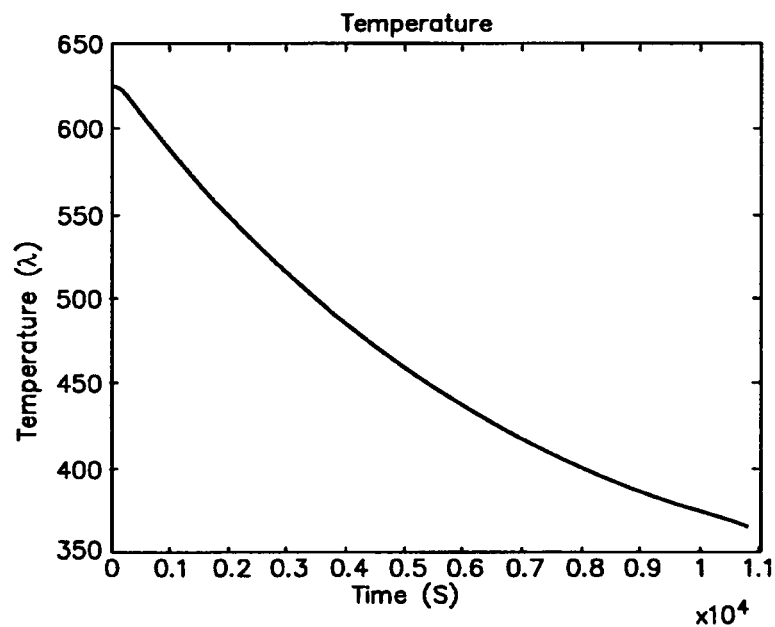
FIG. 5 is a FEA simulation of temperature profile of a cylinder cooling under 1.1 bara.
Figure 6:
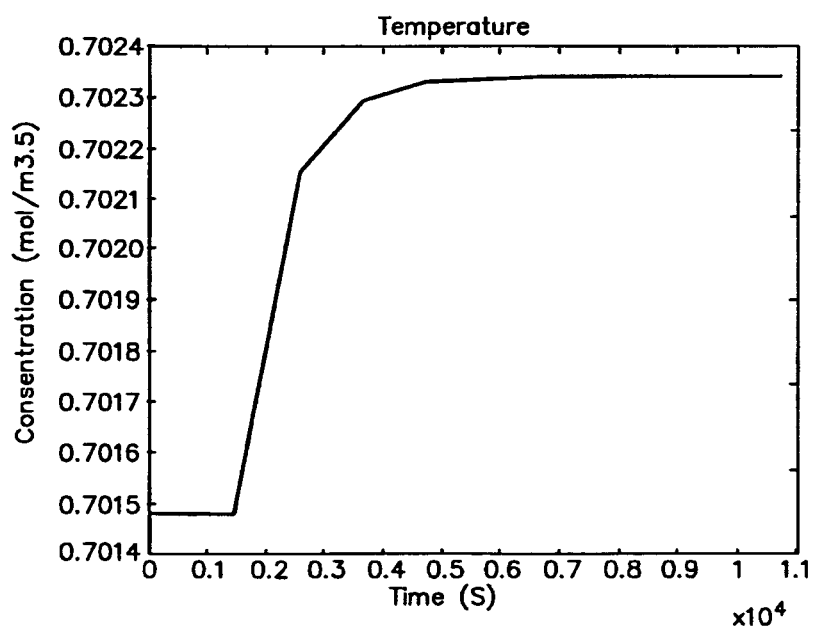
FIG. 6 is a FEA simulation of concentration profile of a cylinder cooling under 1.1 bara.

Referring to FIG. 4, the connection of hydrogen storage vessels 1A, 1B, 1C is schematically shown. The hydrogen storage vessels are filled with a suitable hydrogen storage material such as $MgH_2$ or other hydride forming alloy which absorbs hydrogen above a predetermined temperature and pressure and desorbs hydrogen when the temperature is raised above the desorption temperature. The vessels are connected in parallel by a common desorption gas manifold 2 to a hydrogen supply line 3. The supply line 3 is generally on site where the hydrogen storage vessels are delivered to meet a hydrogen demand at the site.

A hydrogen conduit 4A, 4B, 4C is connectable to the hydrogen storage vessels 1A, 1B, 1C respectively to receive hydrogen gas discharged from that vessel. A hydrogen storage vessel containing hydrogen storage material such as magnesium hydride discharge hydrogen under a constant pressure when heated to the absorption temperature. Hydrogen continues to be discharged until it is substantially empty at which time the discharge pressure drops dramatically.

The hydrogen discharge conduits 4A, 4B, 4C connecting to the hydrogen desorption manifold are preferably provided with backflow prevention devices 5A, 5B, 5C such as one way valves which prevent hydrogen gas in the manifold from returning to the discharge/spent/depleted hydrogen storage vessel 1A, 1B, 1C respectively. As the decrease in discharge pressure from the hydrogen storage vessel occurs close to the point at which the hydrogen storage vessel is totally depleted, it is essential for the continual supply of hydrogen to the hydrogen supply line that the next hydrogen storage vessel to supply hydrogen is heated to the required desorption temperature by the time that the pressure begins to decrease in the nearly depleted hydrogen storage vessel.

Figure 1:
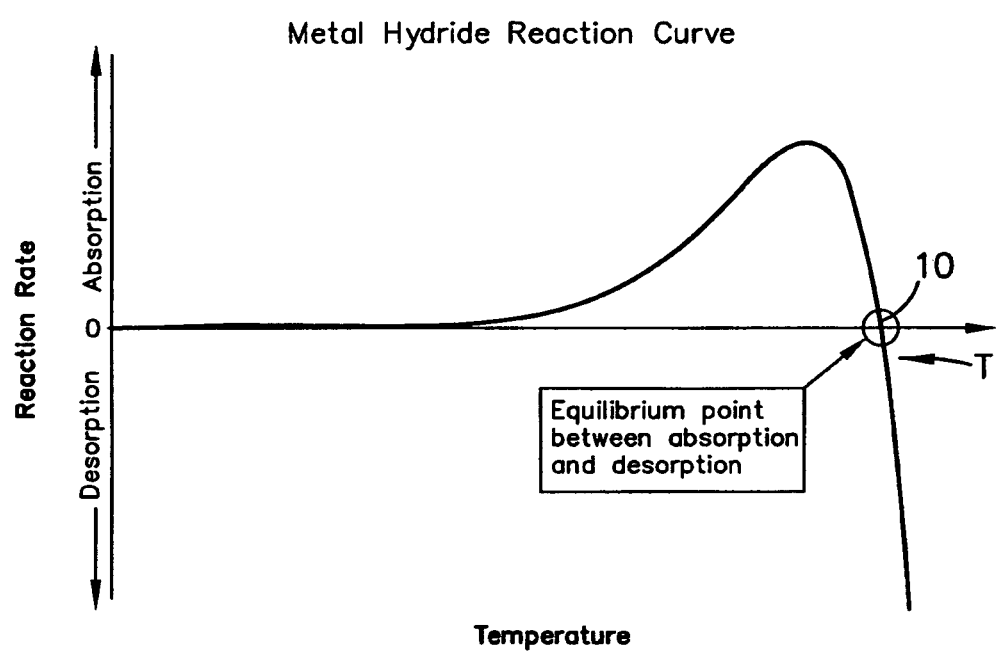
FIG. 1 is a graph of a typical reaction rate versus temperature curve for hydrogen absorption of a metal hydride material. The equilibrium points between absorption and desorption for a given pressure is defined by the intersection of the x-axis.

A process controller 7 monitors the desorption process in the discharging hydrogen storage vessel and commences heating the next hydrogen storage vessel at an appropriate time prior to the pressure drop to ensure continuity of supply. This is done by activating heating element 6A, 6B, 6C at the appropriate time. The operation of the controller will be described in more detail later. The heating elements may be electrical heating elements which are located either internally or externally of the hydrogen storage vessels. To enhance the effects of the heating an insulated heating jacket may be provided during the heating and desorption operation. Once the hydrogen storage vessel 1A, 1B, 1C has finished discharging hydrogen, the energy source to the heating element of the hydrogen storage vessel is deactivated and the hydrogen storage material is allowed to cool. Ideally any insulated jacket may be removed when the heating elements deactivated. As illustrated in FIG. 1, once the hydrogen storage material cools below the equilibrium temperature (in the direction of arrow T), the kinetics for the absorption/the absorption reaction favours absorption of hydrogen. Hence all hydrogen available to the hydrogen storage material is absorbed potentially creating a negative pressure (ie. pressure below atmospheric, 1 bar absolute) in the hydrogen storage vessel.

If it is desirable to prevent pressure in the hydrogen storage vessel dropping below atmospheric pressure, an ancillary supply source communicates with the exhausted hydrogen storage vessel at least during cooling. The ancillary supply source may be provided to the supply conduit 8A, 8B, 8C through a backflow prevention device 9A, 9B, 9C such as a one way valve. The ancillary supply source may be a separate hydrogen supply 11 such as a gas cylinder through a valve 12 or it may be a branch line 8 from the absorption gas manifold. The branch line 8 is provided with a pressure control valve to step down the pressure from the absorption manifold supply pressure to a pressure that is slightly above atmospheric ie. preferably in the range of 1-2 bar absolute. While the absorption/desorption reaction is in absorption cycle during the cool down stage of the hydrogen storage material, the reaction kinetics is very slow at that pressure so only a small volume of the hydrogen is actually absorbed.

It may be acceptable to allow a vacuum to develop in the hydrogen storage vessel and so no ancillary source need be provided. Alternatively the vacuum may be filled with other gases such as argon, nitrogen or air supplied separately or air may be intentionally allowed to leak in and fill the vacuum.

To further limit the amount of hydrogen reabsorbed into the cooling emptied hydrogen storage cylinder, the rate of cooling of the hydrogen storage material may be increased by improving the cooling of the emptied cylinder by either or both passive or active cooling of the cylinder and as shown in FIG. 1 reduce the reaction rate of the hydrogen absorbing onto the hydrogen storage material. Passive cooling may take the form of removing any external insulation which may be covering the exterior of the cylinder and active cooling may involve the use of an air blower over the exterior surface of the emptied cylinder or the use of a water-cooled jacket The operation of the process controller will now be described. The individual control and sequential desorption of each pressure cylinder minimises heat loss by ensuring only one cylinder is actively desorbing. An additional cylinder is pre-heated at an appropriate time to seamlessly take over the supply of hydrogen once the active cylinder empties. The remaining cylinders are stored at room temperature until required The operation of the system can be simplified as follows
1. Cylinder A desorbing
2. Cylinder A reaches 80% depth of discharge and initiates warm-up of Cylinder B (taking 15 minutes)
3. Cylinder B begins desorbing automatically as soon as it reaches temperature. At this stage cylinder A is still not 100% empty. Cylinder A continues to desorb slowly in parallel with Cylinder B.
4. Cylinder B reaches 20% depth of discharge and initiates cool-down of cylinder A.

Assuming a constant flow rate of hydrogen, the average number of cylinders heated at any point of time can be estimated as, $$\mathrm{avg}(n)=1.4$$

Figure 2:
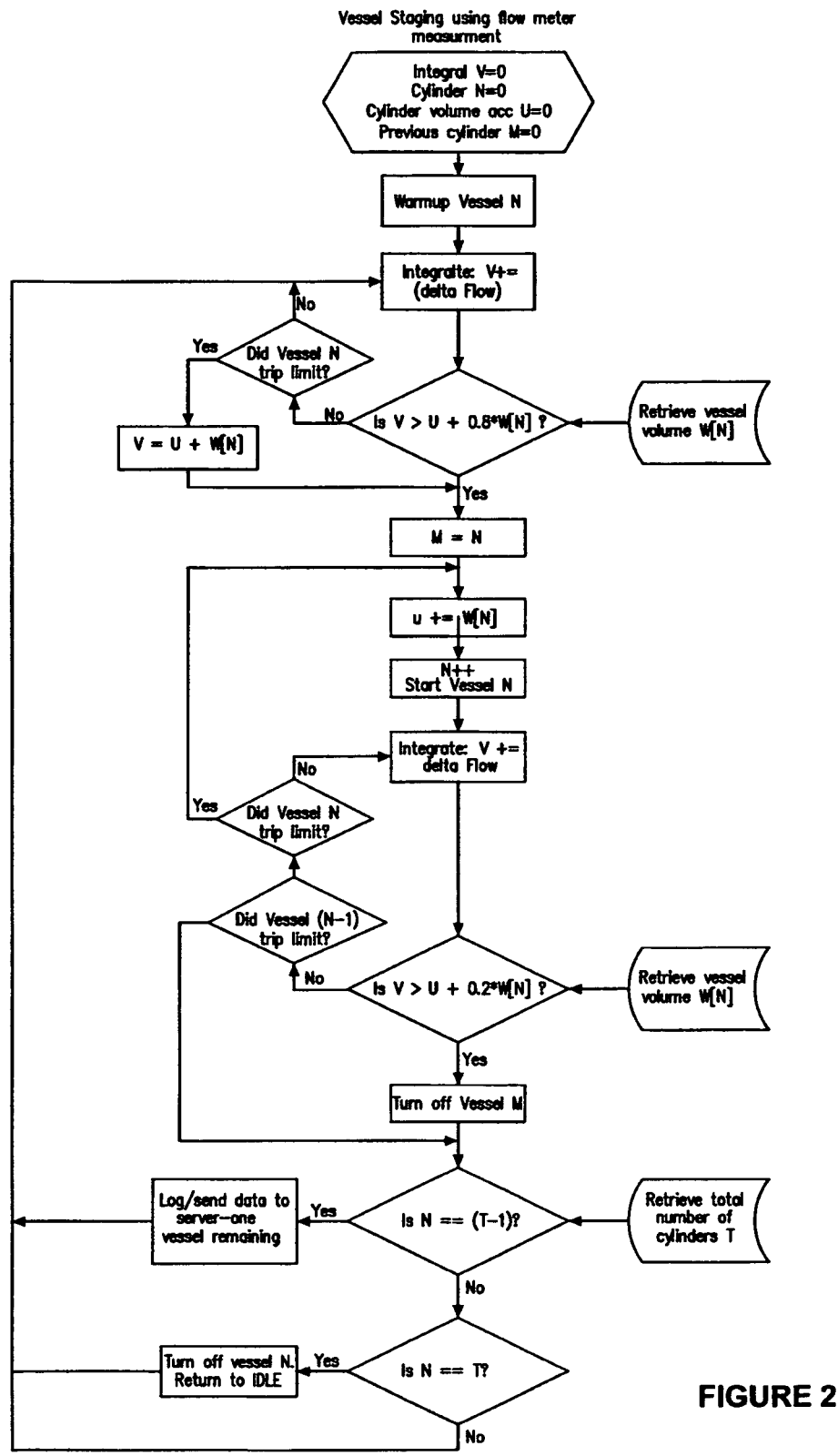
FIG. 2 is a flow chart for sequential desorption of manifolded metal hydride cylinders based on digital mass flow meter integration.

The sequencer controller keeps track of the volume of hydrogen desorbed from each cylinder in order to manage the pre-heating of the next cylinder in the sequence and the cool down of the emptied cylinder. The sequencer controller can be a programmable logic controller (PLC), a personal computer (PC), or any microprocessor based embedded controller with communications capabilities. FIG. 2 depicts an example software flow chart for implementation in a PLC to manage the sequencing of the cylinders.

The depth of discharge can be calculated from integration of mass flow and implemented as shown in FIG. 2. Alternatively, the heater power can also be used to approximate the mass flow of hydrogen and hence infer the depth of discharge.

The flow rate of hydrogen is related to the heater power by the following equation, $$F.R.\left(\frac{kg}{h}\right) = \frac{P_{heater}(kW) - P_{losses}(kW)}{\Delta H\left(\frac{kWh}{kg}\right)}$$

The enthalpy of reaction $\Delta H$ is a chemical property of the hydride. For $MgH_2$, $$\Delta H = 10.39\left(\frac{kWh}{kg}\right)$$

The depth of discharge can easily be calculated from the flow rate by subtracting the integral from the capacity of the storage unit.

$$DOD(\%) = \frac{C_{max(kg)} - \int F.R.\left(\frac{kg}{h}\right) dt(h)}{C_{max(kg)}} \times 100(\%)$$

In order for this to be accurate, a good estimate of the instantaneous losses is needed. The losses will be a characteristic of the storage system but will also be dependent on ambient temperature. One possible way to estimate the losses is by sampling the ambient temperature. Alternatively, the warm-up time of the cylinders will be a function of the losses and may also be used.

Figure 3:
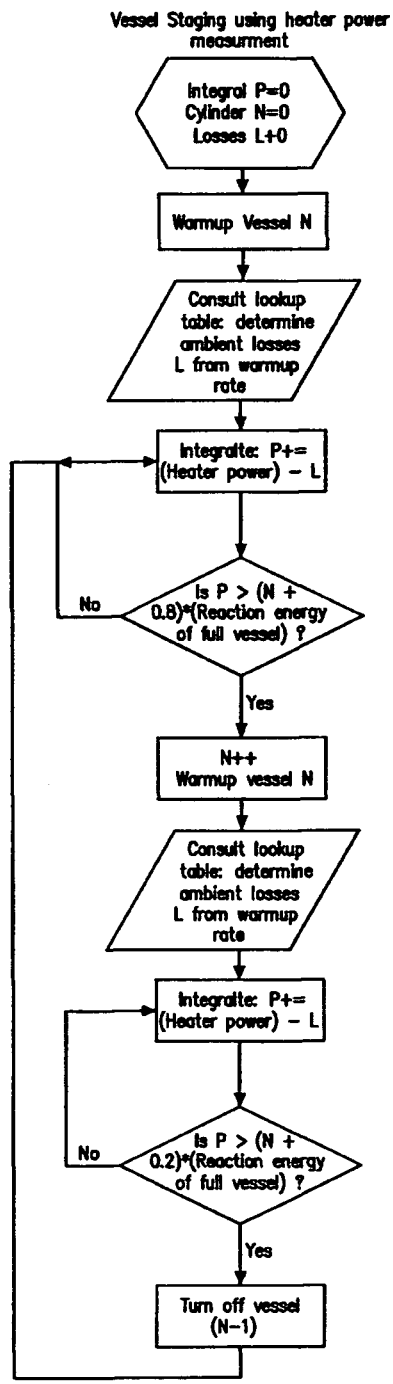
FIG. 3 is a flow chart for sequential desorption of manifolded metal hydride cylinders based on heater power integration.

FIG. 3 depicts an example software flow chart for implementation in a PLC to manage the sequencing of the cylinders based on heater energy.

Alternatively the depth of discharge can be approximated through observation of the metal hydride temperature and desorption pressure.

As mentioned above, the cooling down of the solid state cylinders is managed by the inclusion of two one way gas valves (9A, 9B, 9C, 5A, 5B, 5C) on each cylinder and a pressure control valve between the desorption manifold and the absorption manifold.

The one-way valve on the desorption side of the cylinder provides an isolation means between the cooling cylinder and the desorption manifold. So, if cylinder 1A is cooling, hydrogen cannot flow backwards from the common desorption manifold 2 to the cylinder 1A. Hence, the cylinder cannot re-absorb hydrogen that is being sourced from cylinder 1B. However, cylinder 1A can still induce a vacuum by absorbing all the free gas available within the cylinder itself.

To maintain cylinder 1A under positive pressure, the pressure control valve 13 between the desorption manifold and the absorption manifold was added. Where hydrogen is to provide the positive pressure, the valve feeds hydrogen from the desorption manifold back into the cylinder at a pressure very close to atmospheric, e.g. 1.1 bara. The absorption rate at this pressure for the cooling cylinder is approximately zero and therefore only a negligible amount of hydrogen is re-absorbed during the cooling. Once the material is cooled to room temperature the absorption rate is zero.

It may be acceptable to allow cylinder 1A to develop a vacuum and so no hydrogen would be provided or to use another gas source such as argon, nitrogen or air to balance the pressure in the cylinder created by the cooling storage material.

It will be understood that the invention disclosed and defined in this specification extends to all alternative combinations of two or more of the individual features mentioned or evident from the text or drawings. All of these different combinations constitute various alternative aspects of the invention.

The claims defining the invention are as follows:

1. A system for delivering a supply of hydrogen to a hydrogen supply line to meet a hydrogen demand at a supply pressure, including:

two or more hydrogen storage vessels containing solid hydrogen storage material from which hydrogen is delivered sequentially from the two or more hydrogen storage vessels, where a supply hydrogen storage vessel supplies hydrogen to the hydrogen supply line and a next hydrogen storage vessel supplies hydrogen when the supply vessel no longer desorbs hydrogen at the pressure of the supply line;

at least one energy delivery system being activatable to supply heat to the solid hydrogen storage material in each hydrogen storage vessel, the heat being sufficient to desorb hydrogen from the solid hydrogen storage material and being deactivatable to no longer supply heat to a respective hydrogen storage vessel when the solid hydrogen storage material is no longer desorbing hydrogen at the pressure of the supply line; and a control system to control activation of the at least one energy delivery system based on the hydrogen demand in the hydrogen supply line, the control system being configured to calculate a remaining hydrogen content in each vessel based on an amount of desorbed hydrogen using a tracking algorithm and determine an anticipated time when hydrogen will need to be supplied from the next hydrogen storage vessel to the hydrogen supply line to meet the hydrogen demand, and activate the energy delivery system in the next hydrogen storage vessel a period of time prior to the anticipated time to allow the material in the next hydrogen storage vessel to be heated to a temperature at which hydrogen can be supplied at the supply pressure of the hydrogen supply line to meet the hydrogen demand in the supply line.

2. The system of claim 1, including two or more hydrogen storage vessels containing hydrogen storage material, the control system being configured to anticipate or determine a time when hydrogen supply from a first hydrogen storage vessel will fall below a predetermined level and activate the energy delivery system in a second hydrogen storage vessel a predetermined time prior to the anticipated or determined time to allow the material in the second hydrogen storage vessel to heat to the temperature at which hydrogen can be supplied at the supply pressure of the hydrogen supply line to meet the hydrogen demand in the supply line.

3. The system of claim 1, wherein the control system comprises
   a meter flow totalizer to monitor the hydrogen content in each vessel, and
   a processor which activates the energy delivery system in the next hydrogen storage vessel when it determines that the hydrogen supply has fallen below a predetermined level.

4. The system of claim 3, wherein the processor deactivates the energy delivery system of the hydrogen storage vessel when the pressure of hydrogen being desorbed from the hydrogen storage material in the hydrogen storage vessel has fallen below the pressure in the hydrogen supply line.

5. The system of claim 1, wherein the control system comprises a tracking algorithm which determines the hydrogen desorbed from the hydrogen storage material based on the heat supplied to the metal hydride in the hydrogen storage vessel, and
   a processor which activates the energy delivery system in the hydrogen storage vessel at a period of time prior to the anticipated time when the supply pressure of the hydrogen supply line has fallen below a predetermined level.

6. The system of claim 1, wherein an auxiliary hydrogen supply system is provided to supply hydrogen to the next hydrogen storage vessel which has been deactivated once the energy delivery system has been deactivated.

7. The system of claim 6, wherein the auxiliary hydrogen supply system is an auxiliary hydrogen conduit from the supply line to at least the hydrogen storage vessel which has been deactivated.

8. The system of claim 7 wherein the auxiliary hydrogen conduit has a pressure control valve to supply hydrogen to the deactivated hydrogen storage vessel at a pressure lower than the pressure in the supply line.

9. The system of claim 8, wherein the pressure control valve supplies hydrogen to the deactivated hydrogen storage vessel at a pressure slightly above atmospheric pressure.

10. The system of claim 9, wherein the pressure control valve is a step down valve.

11. The system of claim 6, wherein the auxiliary hydrogen supply system is a secondary hydrogen storage cylinder.

12. The system of claim 11, wherein the hydrogen gas cylinder supplies gas at a pressure to maintain the pressure in the deactivated hydrogen storage unit at a pressure positive to atmospheric pressure.

13. A method of supplying hydrogen from a hydrogen delivery system to a hydrogen supply line at a supply pressure, the hydrogen delivery system including two or more hydrogen storage vessels containing solid hydrogen storage material from which hydrogen is delivered sequentially from the two or more hydrogen storage vessels, where a supply hydrogen storage vessel supplies hydrogen to the hydrogen supply line and a next hydrogen storage vessel supplies hydrogen when the supply hydrogen storage vessel no longer desorbs hydrogen at the pressure of the hydrogen supply line, at least one energy delivery system being activatable to supply heat to the solid hydrogen storage material in each hydrogen storage vessel, the heat being sufficient to desorb hydrogen from the solid hydrogen storage material; and being deactivatable to no longer supply heat to the hydrogen storage vessel when the solid hydrogen storage material is no longer able to desorb hydrogen at the pressure of the hydrogen supply line; and a control system to control activation of the energy delivery system based on a hydrogen demand in the hydrogen supply line, the method including the steps of
   calculating the hydrogen content in each vessel based on an amount of hydrogen desorbed using a tracking algorithm and determining an anticipated time when hydrogen will need to be supplied from the next hydrogen storage vessel to the hydrogen supply line to meet the hydrogen demand, and
   activating the energy delivery system in the hydrogen storage vessel a period of time prior to the anticipated time to allow the material in the next hydrogen storage vessel to be heated to a temperature at which hydrogen can be supplied at the supply pressure of the hydrogen supply line to meet the hydrogen demand in the supply line.

14. The method of claim 13, wherein the hydrogen delivery system includes two or more hydrogen storage vessels containing hydrogen storage material, and the method includes a step of the control system determining an anticipated time when hydrogen supply from the supply hydrogen storage vessel will fall below a predetermined level and then activating the energy delivery system in the next hydrogen storage vessel a predetermined time prior to the anticipated or determined time to allow the material in the second hydrogen storage vessel to heat to the temperature at which hydrogen can be supplied at the supply pressure of the hydrogen supply line to meet the hydrogen demand in the supply line.

15. The method of claim 13, wherein the control system comprises
   a meter flow totalizer to monitor the hydrogen content in each storage vessel, and
   a processor which activates the energy delivery system in the hydrogen storage vessel when it determines that the hydrogen supply content in the supply hydrogen storage vessel has fallen below a predetermined level.

16. The method of claim 15, wherein the method includes a step of the processor deactivating the energy delivery system of the supply hydrogen storage vessels when the pressure of hydrogen being desorbed from the hydrogen storage material in the supply hydrogen storage vessel has fallen below the pressure in the hydrogen supply line.

\* \* \* \* \*